United States Patent
Rowe et al.

(10) Patent No.: US 9,991,717 B1
(45) Date of Patent: Jun. 5, 2018

(54) METHOD AND APPARATUS FOR CONNECTING AND DISCONNECTING A PHOTOVOLTAIC MODULE TO A DISTRIBUTION SYSTEM

(71) Applicant: ROCO, LLC, Ringoes, NJ (US)

(72) Inventors: Jamie B. Rowe, Ringoes, NJ (US); Michael R. Rowe, Ringoes, NJ (US); Michael D. Cooper, Hopewell, NJ (US)

(73) Assignee: ROCO, LLC, Ringoes, NJ (US)

( * ) Notice: Subject to any disclaimer, the term of this patent is extended or adjusted under 35 U.S.C. 154(b) by 123 days.

(21) Appl. No.: 15/181,601

(22) Filed: Jun. 14, 2016

Related U.S. Application Data

(60) Provisional application No. 62/175,516, filed on Jun. 15, 2015.

(51) Int. Cl.
*H02J 3/38* (2006.01)
*H02M 7/44* (2006.01)

(52) U.S. Cl.
CPC .............. *H02J 3/383* (2013.01); *H02M 7/44* (2013.01)

(58) Field of Classification Search
CPC ................... H02J 1/06; H02J 1/00; H02J 9/00
See application file for complete search history.

(56) References Cited

U.S. PATENT DOCUMENTS

| | | | |
|---|---|---|---|
| 2,912,535 A | 10/1957 | Sullivan | |
| 3,843,853 A | 10/1974 | Panek et al. | |
| 4,327,318 A | 4/1982 | Kwon et al. | |
| 4,659,909 A | 4/1987 | Knutson | |
| 4,818,970 A | 4/1989 | Natale et al. | |
| 5,625,345 A | 4/1997 | Stark et al. | |
| 5,670,074 A | 9/1997 | Kass et al. | |
| 6,130,412 A | 10/2000 | Sizemore | |
| 7,327,246 B2 | 2/2008 | Schoor | |
| 7,471,195 B2 | 12/2008 | Roark et al. | |
| 7,807,919 B2 | 10/2010 | Powell et al. | |
| 8,013,472 B2 | 9/2011 | Adest et al. | |
| 8,274,172 B2 | 9/2012 | Hadar et al. | |
| 8,319,471 B2 | 11/2012 | Adest et al. | |
| 8,384,243 B2 | 2/2013 | Adest et al. | |
| 8,473,250 B2 | 6/2013 | Adest et al. | |
| 8,531,055 B2 | 9/2013 | Adest et al. | |
| 8,841,916 B2 | 9/2014 | Avrutksy | |
| 8,854,193 B2 | 10/2014 | Makhota et al. | |
| 8,963,375 B2 | 2/2015 | DeGraaff | |

(Continued)

OTHER PUBLICATIONS

Tigo Energy, Tigo's Smart Platform, TS4 Platform, www.tigoenergy.com, Los Gatos, CA, USA.

(Continued)

*Primary Examiner* — Robert Deberadinis
(74) *Attorney, Agent, or Firm* — Volpe and Koenig, P.C.

(57) ABSTRACT

A method and apparatus for electrically connecting and disconnecting a photovoltaic (PV) module from a distribution system includes determining whether one or more conditions are met to connect the PV module to the distribution system. The PV module is connected to the distribution system based upon the determination of whether the one or more conditions are met, and the one or more conditions are monitored. The PV module is disconnected from the distribution system if one or more of the conditions are not met.

21 Claims, 4 Drawing Sheets

(56) References Cited

U.S. PATENT DOCUMENTS

| | | | |
|---|---|---|---|
| 9,007,210 | B2 | 4/2015 | Avrutsky et al. |
| 9,043,039 | B2 | 5/2015 | Eizips et al. |
| 2012/0175961 | A1 | 7/2012 | Har-Shai et al. |
| 2012/0175963 | A1 | 7/2012 | Adest et al. |
| 2012/0175964 | A1 | 7/2012 | Yoscovich et al. |
| 2012/0212066 | A1 | 8/2012 | Adest et al. |
| 2012/0248863 | A1 | 10/2012 | Adest et al. |
| 2012/0274138 | A1* | 11/2012 | Bundschuh ....... H01L 31/02021 307/64 |
| 2012/0299309 | A1 | 11/2012 | Sarrus et al. |
| 2013/0002335 | A1 | 1/2013 | DeGraaff |
| 2013/0009483 | A1* | 1/2013 | Kawate ................ H02J 3/383 307/77 |
| 2013/0043839 | A1 | 2/2013 | Adest et al. |
| 2013/0063119 | A1 | 3/2013 | Lubomirksy |
| 2013/0175971 | A1 | 7/2013 | Har-Shai et al. |
| 2013/0193945 | A1 | 8/2013 | Adest et al. |
| 2013/0194706 | A1 | 8/2013 | Har-Shai et al. |
| 2013/0229844 | A1 | 9/2013 | Gazit et al. |
| 2013/0241317 | A1 | 9/2013 | Sarrus et al. |
| 2013/0250467 | A1 | 9/2013 | Sarrus et al. |
| 2014/0063672 | A1 | 3/2014 | Sarrus et al. |
| 2014/0231230 | A1 | 8/2014 | Sarrus et al. |

OTHER PUBLICATIONS

Tigo Energy, Smart Junction Box—MM-JES, MMJ-ES, HBF-JES, www.tigoenergy.com, Los Gatos, CA, USA.

Tigo Energy, Dual Maximizer—ES (MM-2ES) Data Sheet, MM2ES, www.tigoenergy.com, Feb. 3, 2014, www.tigoenergy.com, Los Gatos, CA, USA.

* cited by examiner

METHOD AND APPARATUS FOR CONNECTING AND DISCONNECTING A PHOTOVOLTAIC MODULE TO A DISTRIBUTION SYSTEM

CROSS REFERENCE TO RELATED APPLICATIONS

This Application claims the benefit of U.S. Provisional Patent Application No. 62/175,516, filed Jun. 15, 2015, which is incorporated herein by reference as if fully set forth.

FIELD OF INVENTION

The present invention is directed to a bridge device, and more particularly to a method and apparatus for connecting and disconnecting a photovoltaic module to a distribution system.

BACKGROUND

With many homes and businesses now employing solar energy generators, the possibility of harm coming to emergency personnel, such as firefighters, has become an issue. Even though power from as solar energy generation system may be disconnected from a load during an emergency, the conductor string on the source side of an inverter may still be energized. This may result in a dangerously high voltage on the string with which someone working on the system, (e.g., an emergency worker), could come into contact.

It would therefore be beneficial to provide a method and apparatus to disconnect the energy producing elements to render them safe for emergency personnel.

SUMMARY

A method and apparatus for electrically connecting and disconnecting a photovoltaic (PV) module from a distribution system is disclosed. The method includes determining whether one or more conditions are met to connect the PV module to the distribution system. The PV module is connected to the distribution system based upon the determination of whether the one or more conditions are met, and the one or more conditions are monitored. The PV module is disconnected from the distribution system if one or more of the conditions are not met.

DETAILED DESCRIPTION

Although a more detailed description is provided below, briefly a method and apparatus for connecting and disconnecting a photovoltaic module to a generating system is described. The photovoltaic module is connected to the system to provide electricity to a load, such as a home, business, the utility grid, or the like. In the case of an event such as an emergency, the photovoltaic module is disconnected from the system.

Figure 1:
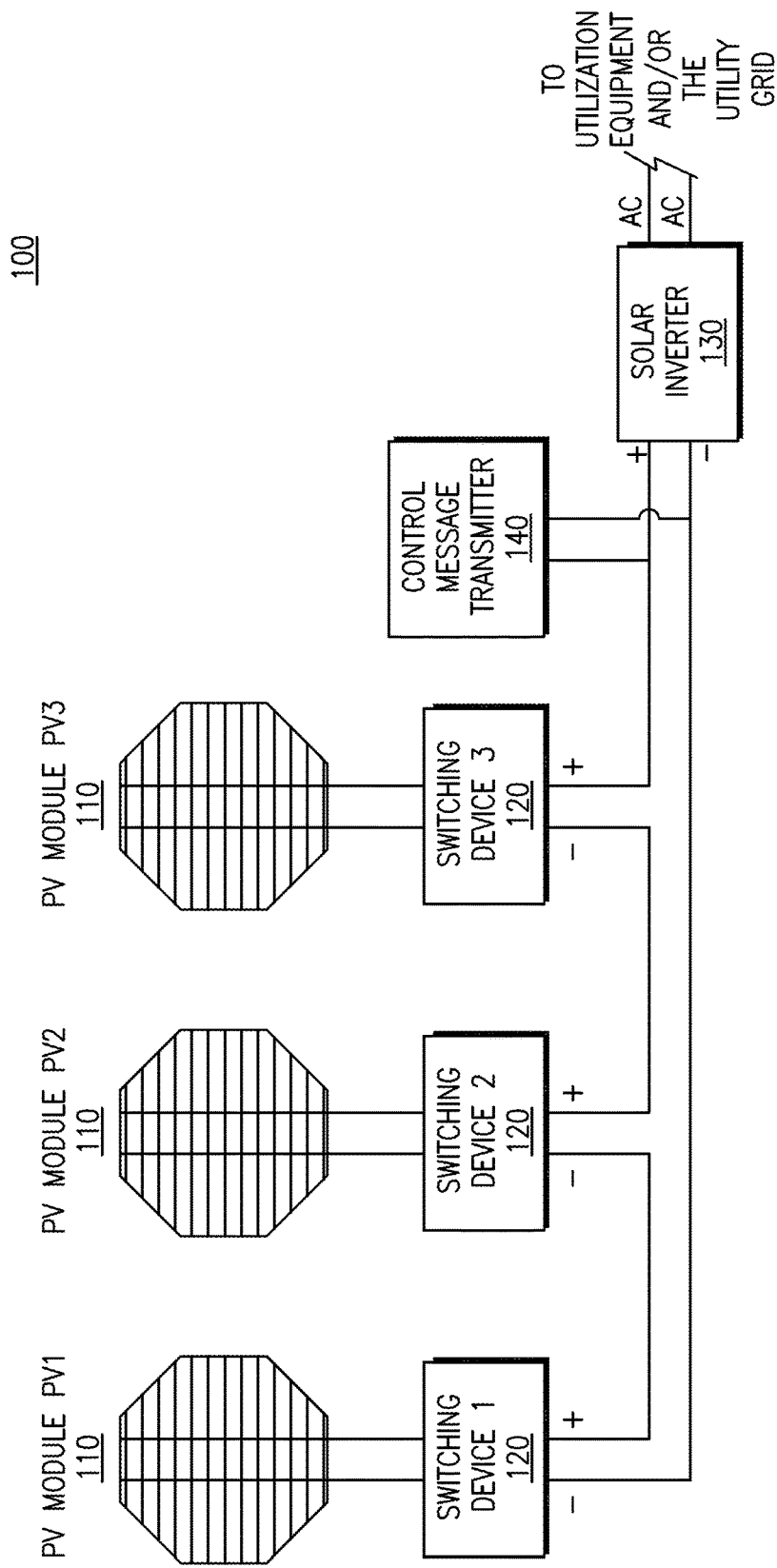
FIG. 1 is an example system diagram of a photovoltaic system.

FIG. 1 is an example system diagram of a photovoltaic system 100.

The system 100 includes a plurality of photovoltaic (PV) modules 110, (designated $PV_1$ 110$_1$, $PV_2$ 110$_2$, ..., $PV_N$ 110$_N$), switching devices 120, (designated 120$_1$, 120$_2$, ..., 120$_N$), an inverter 130, and a control message transmitter 140. As shown in FIG. 1, each photovoltaic module 110 includes an associated switching device 120 for connecting it to and from the system string S via the positive (+) and negative (−) conductors. The string S connects each of the PV modules 110 to the inverter 130. The control message transmitter 140 provides a control message, (e.g., ≅8 Volts), direct current (DC) control signal to the switching devices 120 and may be located in, at or near the inverter 130. The inverter converts the direct current (DC) power generated from the PV modules 110 into alternating current (AC) power for use by a load (not shown). The load may include a residence, a commercial structure, the utility grid, or the like. The control message created by the control message transmitter 140 may include repeating groups of DC current pulses and spaces that are to be read by the switching devices 120 and control the operational state of system 100. The control message transmitter 140 may alter the communication message during an emergency condition, (e.g., fire), so that it sends a message to disconnect the PV modules 110 from the system. This alteration may occur manually by, for example, emergency personnel that can operate a switch, or automatically, for example, by an alarm system (not shown) that is connected to the control message transmitter 140. That is, when an emergency condition occurs, the alarm system, or a manual operator may initiate the disconnect control message via the control message transmitter 140 and thus broadcast the disconnect control message on the string S, causing the switching devices to disconnect from the string S.

Figure 2:
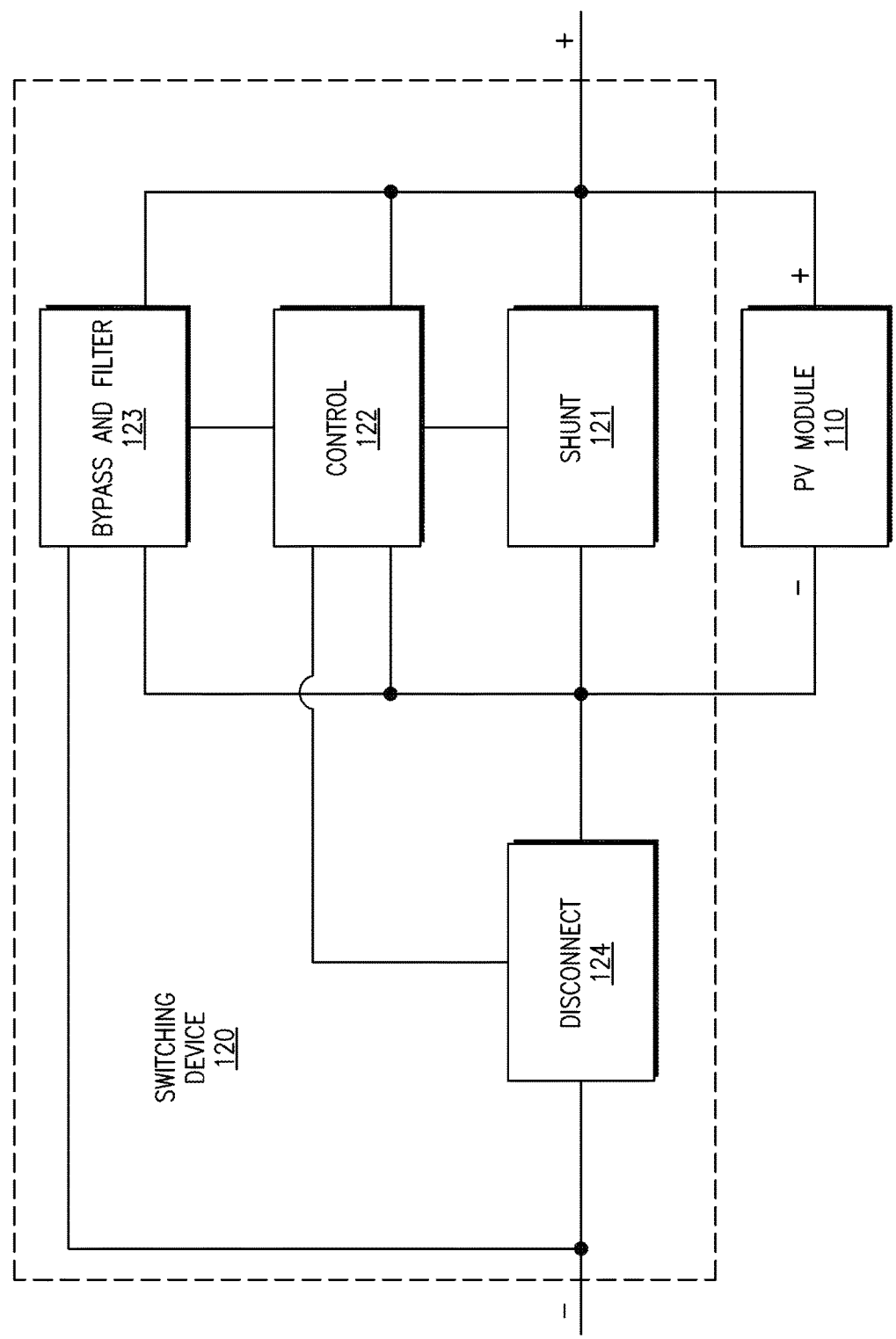
FIG. 2 is a functional block diagram of an example switching device for use in the photovoltaic system of FIG. 1.

FIG. 2 is a functional block diagram of an example switching device 120 for use in the photovoltaic system 100 of FIG. 1. The example switching device 120 includes a module shunt device 121, a control device 122, a CM (control message) bypass and filter device 123, and a module connect/disconnect device 124. The module shunt device 121 lowers the voltage output of the PV module 110 (also shown in FIG. 2), to instantly reduce the available power in the array, extinguish any active arcs and allow the module connect/disconnect device 124 to electrically disconnect and isolate the PV module 110 from the string S, while at reduced voltage/power.

The control device 122 tests the health and control message status of the PV module 110, and depending on one or more conditions, controls the module shunt device 121 and module connect/disconnect device 124 to connect or disconnect the PV module 110 from the string S. The CM bypass and filter device 123 operates to filter the incoming control message from the control message transmitter 140, and to deliver the control message to the control device 122. The CM bypass and filter device 123 may also operate to bypass the control message around the module connect/disconnect device 124.

The module connect/disconnect device 124 operates to disconnect the PV module 110 from the string S. The module connect/disconnect device 124 is controlled by the control device 122 so that under one or more predefined conditions, the module connect/disconnect device 124 operates. In operation, the module connect/disconnect device 124 may be utilized to connect the PV module 110 to the string S depending upon the one or more conditions.

Figure 3:
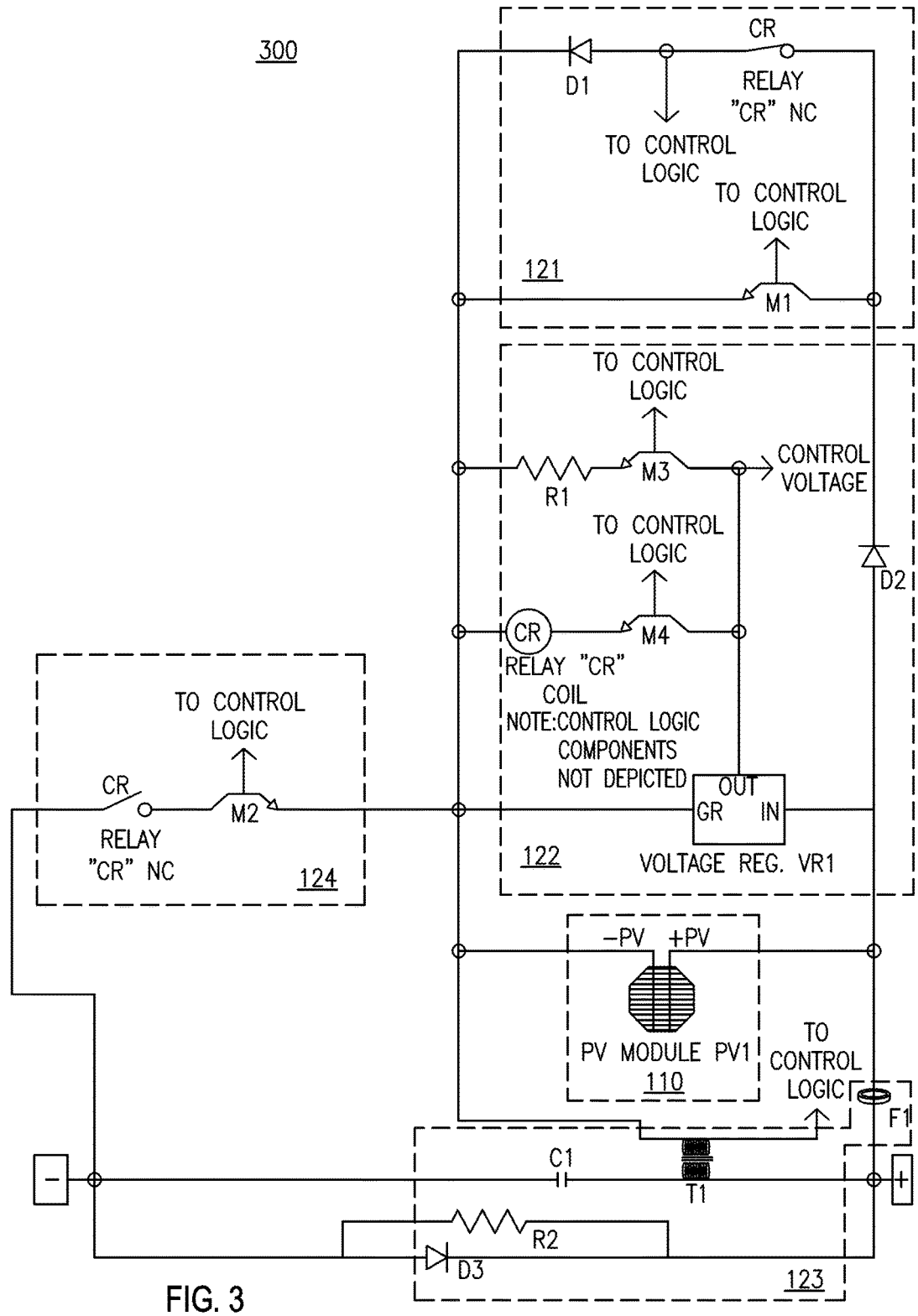
FIG. 3 is an example schematic diagram of the example switching device of FIG. 2.

FIG. 3 is an example schematic diagram 300 of the example switching device 120 of FIG. 2. The example switching device 120 includes a plurality of transistors, (designated M1, M2, M3 and M4), a plurality of diodes, (designated D1, D2, and D3), a voltage regulator VR1, a plurality of capacitors, (designated C1 and C2), a transformer T1, a ferrite bead F1, a resistor R1, a normally closed relay CR NC, a normally open relay contact CR NO, and a relay coil CR.

Figure 4:
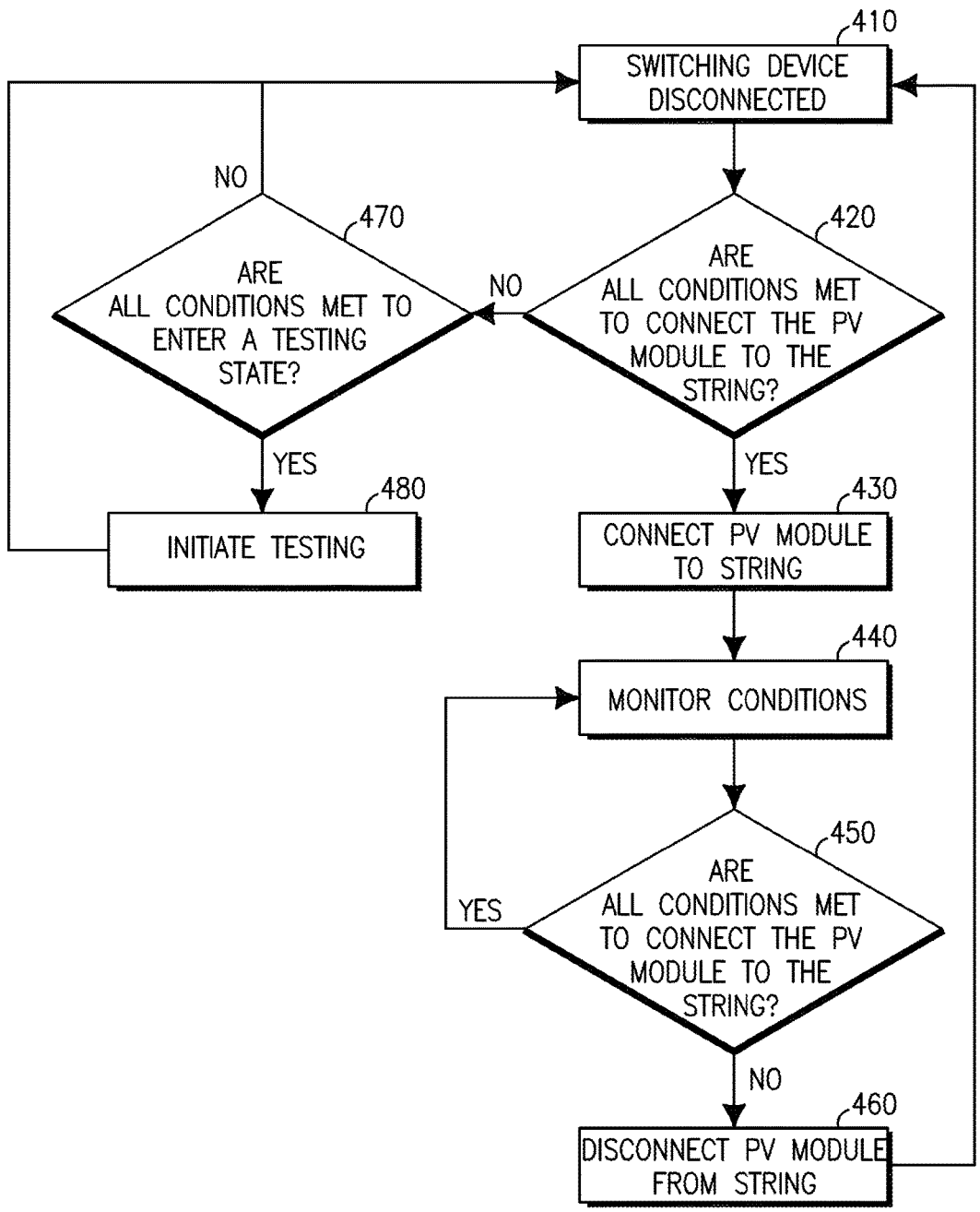
FIG. 4 is a flow diagram of an example method for connecting and disconnecting a photovoltaic (PV) module to a PV string.

FIG. 4 is a flow diagram of an example method 400 for connecting and disconnecting a PV module 110 to a PV string circuit. In step 410, the system, (e.g., system 100 of FIG. 1), is in a disconnected state. For example, in the early morning hours of a day, after the system has been dormant throughout the night, the system may be in a disconnected state as daylight begins to cause the PV modules 110 to begin generating electricity.

In step 420, it is determined whether or not the initial conditions to connect the PV module 110 to the string S are met. For example, it is determined whether there is enough power being generated to operate the relay coil CR. Referring back to FIG. 3, this may be determined where the PV module PV1 is able to generate enough voltage, (e.g., 5V), to activate the voltage regulator VR1 in order to provide enough control voltage CV to operate the relay coil CR. For this purpose, R1 may be sized such that when transistor M3 is turned on, slightly more current is drawn through its branch than is needed to operate the relay coil CR when transistor M4 is turned on. M3, R1s transistor, and M4, the relay coils transistor, work opposite each other, when one is on the other is off. The resistor R1 that is connected when M3 is on may be sized to draw slightly more power than is needed to open the relay coil. When the system can maintain normal control voltage while M3 is on, supplying power to resistor R1, the relay will have enough power to operate as long as M3 is turned off when M4 is turned on. M3 and R1 mimic the power requirements for M4 and the coil. It takes more power to open the coil than is does to hold it open. This allows for some hysteresis to ensure the relay does not chatter, (i.e., operate on and off rapidly).

Additionally, it is determined whether or not the normally closed relay contact CR NC is conducting current through diode D1 by reading the value at test point TP1. Diode D1 provides a voltage drop that is read at TP1 when normally closed relay contact CR NC is conducting current. Additionally, the forward bias voltage of D1 may be such that it is higher than the voltage drop across transistor M1 during saturation. Furthermore, it is determined whether or not the shunting transistor, (i.e., M1), is closed, (i.e., on) such that current is being shunted through diode D2. (This is done to prevent the CR NC contact from opening under load if M1 is malfunctioning.)

Additionally, it is determined whether the connect control message, delivered by the control message transmitter 140 is being read by the control device 122. If all of the initial conditions are met in step 420. That is, if there is enough power to operate the relay coil CR, the normally closed relay contact CR NC is not conducting current, transistor M1 is on/saturated, and the control message is indicating connect, then the PV module PV1 is connected to the string S (step 430). If any of the conditions are not met, module PV1 remains in the disconnected state (step 410).

Referring now to step 430, where the PV module PV1 is connected to the string circuit. This connects the PV1 module 110 to the string S. When the switching device is connecting, the electro-mechanical switches CR NO and CR NC act first. When disconnecting, M1 and M2 act first. This ensures that the electro-mechanical relay contacts do not open or close under load. M1 and the normally closed contact are wired in parallel, so when the unit is connecting, the normally closed contact opens, while M1 is still on, ensuring there is not any current broken by the normally closed contact. When disconnecting, M1 turns on first, while the normally closed contact is still open, ensuring that the contact does not close under load. M2 and the normally open contact are wired in series. When connecting, the normally open contact closes first, while M2 is still off, to ensure no current will flow through the contact at closure. When disconnecting M2 turns off first to break the current flow to allow the normally open contact to open without any load. When the unit is connecting to the string circuit, the relay contacts change state first. When the unit is disconnecting from the string circuit, M1 and M2 change state first. This ensures that the relay contacts do not open or close under load.

In this manner the electro-mechanical switches make first and brake last when connected in series with electronic switching, (e.g., transistors M), and the electro-mechanical switches brake first and make last when connected in parallel with electronic switching.

Once the PV1 module 110 is connected to the string S, and providing power to the inverter 130, the system 100 enters into a state where conditions are monitored (step 440). During the monitoring, it is determined whether or not all the conditions that need to be met for PV1 module 110 to remain connected to the string (step 450). That is, all of the initial conditions determined in step 420 are required to be met in step 450. If all the conditions continue to be met, then the PV1 module 110 remains connected to the string S, and the method returns to the monitoring step (440).

However, if all of the conditions are not met in step 450, then the PV1 module 110 is disconnected from the string S. For example, as described above, during an emergency, the control message transmitter 140 may change the control message to the switching device 120 from connect to disconnect. Accordingly, in that case, control device 122 of FIG. 2 operates the shunt device 121 to shunt the power generated by the PV module 110 and operates the module connect/disconnect device 124 to disconnect the PV module 110 from the string circuit S.

Referring again to FIG. 3, this may be performed by first turning on transistor M1 and turning transistor M2 off while opening normally open relay contact CR NO and closing normally closed relay contact CR NC, after a short time delay. This operation puts the system back into the disconnected state (step 410).

Referring again to step 420, if the conditions are not met to connect the PV module 110 to the string circuit S, the method proceeds to step 470, wherein if all conditions are met for entering a testing state, including the control message is indicating a testing state, the device will enter step 470 wherein the switching elements predetermined in the testing state will be activated. After the test state has completed the device will return to step 410.

Additionally, in step 420 and 470 the control message may convey information as follows: When the current pulse group is "X" pulses long and the space between pulses is the equivalent of "Y" pulses long, the "Z" operation is initiated. The "Z" operation may initiate any number of functions and steps, including, but not limited to connecting the PV module 110, disconnecting the PV module 110 and testing the switching device 120.

It is to be understood that the description above is not limited to the embodiments described above, but encompasses any and all embodiments within the scope of the following claims. Additionally, although the features and elements of the present application are described in the example embodiments in particular combinations, each feature or element can be used alone (without the other features and elements of the example embodiments) or in various combinations with or without other features and elements of the present application.

For example, the transistors depicted in the above description relating to FIG. 3 may be bipolar junction (BJT) transistors, metal oxide semiconductor field effect (MOSFET) transistors, or the like. In addition, the transistors may be p-type or n-type transistors. Additionally, although control message transmitter is depicted in, at or near the inverter, it should be noted that the control message transmitter could be located at any practical location. Additionally, although transistors are utilized throughout as electronic switches, it should be understood that other components capable of electronic switching may be utilized.

Additionally, the methods provided, to the extent applicable, may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein, to the extent applicable, may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for electrically connecting and disconnecting a photovoltaic (PV) module from a distribution system, the method comprising:
    providing an electronic switch and an electro-mechanical switch, the electronic switch connected in series with the electro-mechanical switch to connect and disconnect an output of the PV module;
    determining whether one or more conditions are met to connect the PV module to the distribution system;
    connecting the PV module to the distribution system based upon the determination of whether the one or more conditions are met, wherein the electro-mechanical switch operates before the electronic switch;
    monitoring the one or more conditions; and
    disconnecting the PV module from the distribution system if one or more of the conditions are not met, wherein the electronic switch operates before the electro-mechanical switch,
    wherein the electronic switch operates first on disconnect and last on connect to allow the mechanical switch to make and break without current flow.

2. The method of claim 1 wherein the one or more conditions include the presence of a control message.

3. The method of claim 2 wherein the control message is generated by a control message transmitter.

4. The method of claim 3 wherein the control message comprises a series of repeating DC current pulse groups and repeating spaces which are superimposed on the distribution string circuit or to a PV output circuit connecting the PV module to the distribution string circuit.

5. The method of claim 3, further comprising altering the control message by changing the length of the repeating current groups and spaces.

6. The method of claim 5, further comprising altering the control message by manually activating a switch connected to the control message transmitter.

7. The method of claim 5, further comprising altering the control message automatically by activating inputs connected to the control message transmitter upon the occurrence of an emergency event.

8. The method of claim 5, further comprising altering the control message to initiate one or more condition states for the PV module, the states including any one of a connected state, a disconnected state or a test state.

9. A system, comprising:
    a photovoltaic (PV) module for connection to a distribution string circuit;
    a connect device connected to the PV module for connecting or disconnecting the PV module to the distribution string circuit, the connect device including an electronic switch and an electro-mechanical switch, the electronic switch connected in series with the electro-mechanical switch to connect and disconnect an output of the PV module; and
    a control device connected to the PV module and the connect device,
    configured to connect the PV module to the distribution string circuit based upon one or more conditions being met, wherein the electro-mechanical switch operates before the electronic switch, monitor the one or more conditions, and disconnect the PV module from the distribution string circuit if the one or more of the conditions are not met, wherein the electronic switch operates before the electro-mechanical switch,
    wherein the electronic switch operates first on disconnect and last on connect to allow the mechanical switch to make and break without current flow.

10. The system of claim 9 wherein the one or more conditions include the presence of a control message detected by the control device.

11. The system of claim 10, further comprising a control message transmitter configured to generate the control message.

12. The system of claim 11 wherein the control message comprises a series of repeating DC current pulse groups and repeating spaces which are superimposed on the distribution string circuit or to a PV output circuit connecting the PV module to the distribution string circuit.

13. The system of claim 11 wherein the control message is altered by changing the length of the repeating current groups and spaces.

14. The method of claim 13, further comprising a manual switch connected to the control message transmitter, wherein upon the manual switch being activated, the control message is altered.

15. The system of claim 13 wherein the control message is altered automatically by inputs connected to the control message transmitter that are activated upon the occurrence of an emergency event.

16. The system of claim 13 wherein the alteration of the control message initiates multiple device states including a connected state, a disconnected state or a test state.

17. The system of claim 9 further comprising any one of an additional electronic or an additional electro-mechanical switch connected in parallel with the PV module as a shunt, wherein upon activation of the additional electronic or the additional electro-mechanical switch, available power is reduced in the PV module.

18. An apparatus, comprising:
a control device in communication with a photovoltaic (PV) module and a connect device, the connect device including an electronic switch and an electro-mechanical switch, the electronic switch connected in series with the electro-mechanical switch to connect and disconnect an output of the PV module, the control device configured to connect the PV module to a distribution string circuit based upon one or more conditions being met, wherein the electro-mechanical switch operates before the electronic switch, monitor the one or more conditions, and disconnect the PV module from the distribution string circuit if the one or more of the conditions are not met, wherein the electronic switch operates before the electro-mechanical switch,
wherein the electronic switch operates first on disconnect and last on connect to allow the mechanical switch to make and break without current flow.

19. The apparatus of claim 18 wherein the one or more conditions includes the presence of a control message.

20. The apparatus of claim 19 wherein the control device is in communication with a control message transmitter configured to generate the control message.

21. A system, comprising:
a photovoltaic (PV) module for connection to a distribution string circuit;
an electro-mechanical switch connected in series with an output of the PV module for connecting or disconnecting the PV module to the distribution string circuit;
a second switch connected in parallel with the PV module as a shunt, wherein upon activation of the second switch, available power is reduced in the PV module; and
a control device connected to the PV module, the electro-mechanical switch and the second switch, configured to connect the PV module to the distribution string circuit based upon one or more conditions being met, monitor the one or more conditions, and disconnect the PV module from the distribution string circuit if the one or more of the conditions are not met, wherein the second switch operates before the electro-mechanical switch upon connection and disconnection of the PV module from the distribution string circuit.

* * * * *